June 4, 1968   I. ACKERMAN   3,386,586
DUAL-PURPOSE FILTER DISK FOR COFFEEMAKERS
Filed Dec. 26, 1967
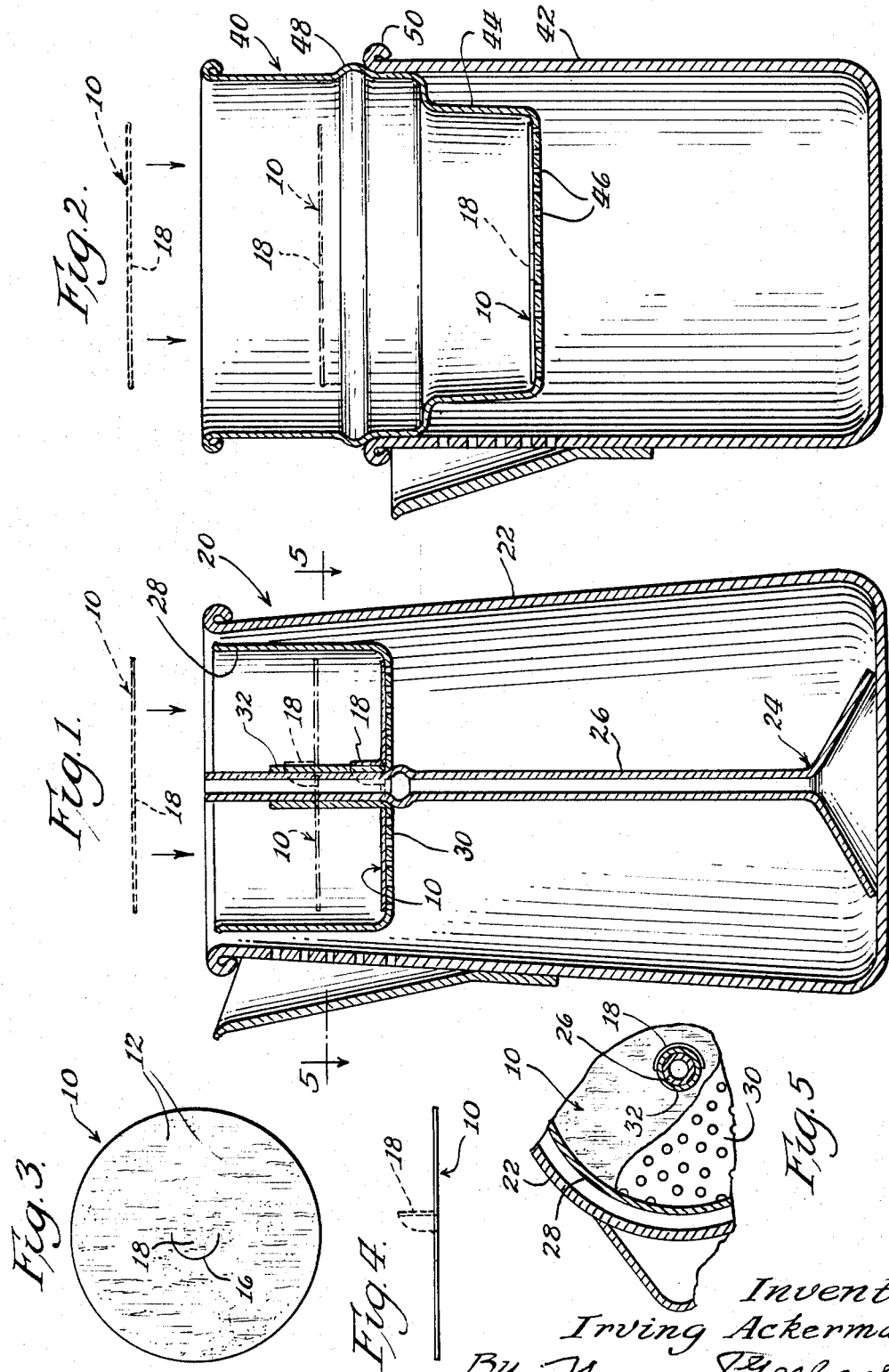
Inventor
Irving Ackerman
By Norman R Gerlach
Atty

United States Patent Office 3,386,586
Patented June 4, 1968

3,386,586
DUAL-PURPOSE FILTER DISK FOR COFFEEMAKERS
Irving Ackerman, 9256 N. Kolmar Ave., Skokie, Ill. 60076
Continuation-in-part of application Ser. No. 607,726, Jan. 6, 1967. This application Dec. 26, 1967, Ser. No. 694,354
1 Claim. (Cl. 210—477)

ABSTRACT OF THE DISCLOSURE

A circular filter disk useable interchangeably with the perforated basket of either of a drip-type or a percolator-type coffeemaking apparatus. A C-shaped slit formed centrally in the disk establishes a D-shaped flap which lies in the plane of the disk when the latter is used with a drip-type coffeemaker, but which is displaced upwardly by the basket stem when the disk is used in a percolator-type coffeemaker. The slit is truly semicircular and has an arcuate extent of 180° so that its ends lie on a diametric line relative to the arc so that all portions of the opening closely hug the basket stem when the latter is projected through the D-shaped opening.

---

The present patent application is a continuation-in-part of my copending patent application Ser. No. 607,726, filed on Jan. 6, 1967, now abandoned, and entitled "Dual-Purpose Filter Disk for Coffeemakers," said application Ser. No. 607,726 being a continuation-in-part of my now abandoned application Ser. No. 565,550, filed on July 15, 1966 and entitled "Dual-Purpose Filter Unit for Coffeemakers."

The present invention relates to a dual-purpose filter disk for conventional or standard coffeemakers.

A filter disk of the type under consideration is so designed that the disk is selectively useable either as a bottom filter liner for the stem-supported coffee basket which is invariably associated with a coffeemaker of the percolator type or as a bottom filter liner for the pot-suspended coffee basket which is invariably associated with a coffeemaker of the drip type. In either case, the filter disk is capable of installation and use in the associated coffeemaker without modification thereof.

The filter area which is involved in connection with both the percolator and drip types of coffeemakers has become fairly well standardized. The baskets which are associated with both types of coffeemakers are made with bottom wall radii ranging in increments of one-half inch and extending from three inches to five inches. At the present time manufacturers of coffeemaker accessories are thus obliged to make and retailers are obliged to stock two sets of filter disks, one set being for use with the baskets of percolator-type coffeemakers, the other set being for use with the baskets of drip-type coffeemakers, and each set including disks which will accommodate five different sizes of baskets. The drip-type filter disks are, of course, imperforate except for their porosity, while the percolator-type filter disks have complete central holes therein in order to accommodate the upper end regions of the basket-supporting riser tubes as well as the upstanding basket sleeves which surround the riser tubes.

The present invention is designed to obviate the necessity for retailers to maintain a large inventory of varying size filter disks for both of the aforementioned types of coffeemakers and, accordingly, the invention contemplates the provision of a filter disk which may be manufactured in the requisite sizes but which will accommodate either the percolator or the drip-type of coffeemaker basket by reason of an upwardly displaceable flap which is formed centrally of the disk by slitting the central portion of the disk on an arc of approximately 180°, and has a diameter substantially the same as the diameter of a standard percolator basket sleeve of maximum commercial variation. When the disk is used in connection with a drip-type coffeemaker, it is simply placed on the bottom of the pot-suspended basket where it will serve its purpose in a manner precisely identical with that of a conventional filter disk without a center hole. When the filter disk is used in connection with a percolator-type coffeemaker, the centrally disposed flap which is established by reason of the aforementioned arcuate slit is aligned vertically with the riser tube and the disk is then threaded over the riser tube and its surrounding basket sleeve and caused to lie flush on the annular bottom wall of the basket. Because of the fact that the central portion of the disk is cut on an arc of approximately 180° and has a diameter substantially equal to that of the upstanding basket sleeve, the flap will automatically become upwardly displaced as the disk is forced over the assembled riser tube and basket sleeve, and the inner periphery of the surrounding filter disk annulus will closely hug the basket sleeve throughout the entire circumferential extent thereof and thus insure full effective filter area. Since the inner periphery of the thus established filter disk annulus closely hugs the basket sleeve, even that portion (base or proximate portion of the flap) of the disk at the inner periphery thereof which is not included in the 180° arc will hug the sleeve so that a 360° sealing area around the basket sleeve will be afforded.

The filter disk of the present invention represents an improvement over previously designed dual-purpose coffee filter disks by reason of its improved sealing function as briefly outlined above. With either a drip-type or percolator-type filter disk it is not only essential for most efficient coffee brewing that the disk is effective to filter or strain the coffee grounds from the liquid filtrate, i.e., the clear liquid coffee solution, but it is also essential that there be a nominal retardation of liquid coffee flow through the filter disk so that the superjacent captured coffee grounds will remain completely submerged in the hot liquid and thus be given an opportunity to become subjected to a brewing action. When the coffee liquid is prematurely drained from the percolator basket by a rapid flow-out action, the liquid coffee is not "brewed" in the strict sense of the word. Rather it is subjected to a capillary moistening action only and there is but partial dissolution of the coffee extract. Bearing these facts in mind, a present-day dual-purpose coffee filter disk which relies for its installation over the upstanding sleeve of the associated percolator basket on the provision of a slit arrangement in the central region of the filter disk is incapable of effecting a complete seal around the basket stem. For example, if the slit arrangement is of cruciform or H shape the basket sleeve will, when the central portion of the filter disk is forced downwards around it, displace upwards the various flaps which are created by the slit arrangement and cause to be formed at the inner or bottom corners of the flaps a multiplicity of voids which provide for direct drainage of unfiltered coffee liquid from the basket into the subjacent portion of the coffee receptacle. Although these voids may be dimensionally extremely small so that they will not accommodate the passage of coffee grounds therethrough, they nevertheless do not effectively retard the flow of coffee liquid and, for reasons outlined above, this results in premature emptying of the basket of its liquid content with little if any time being allowed for a proper coffee brewing action. As previously outlined, the filter disk of the present invention obviates this premature draining of coffee liquid from the percolator basket by affording a complete seal between the central portion of the disk and the upstanding stem of the percolator basket.

The provision of a filter disk of the character briefly outlined above constitutes the principal object of the invention and other invention objects and advantages not at this time enumerated will readily become apparent from a consideration of the following detailed description or specification.

In the accompanying single sheet of drawings forming a part of this specification, one illustrative embodiment of the invention is shown.

In these drawings:

FIG. 1 is a sectional view taken substantially centrally and vertically through a coffeemaker of the percolator type and showing a filter disk embodying the principles of the present invention operatively installed therein;

FIG. 2 is a sectional view taken substantially centrally and vertically through a coffeemaker of the drip type and showing the filter disk installed in the basket thereof;

FIG. 3 is a plan view of the improved filter disk;

FIG. 4 is an edge view of the disk; and

FIG. 5 is a horizontal quarter section taken on the line 5—5 of FIG. 1.

Referring now to the drawings in detail and in particular to FIGS. 3 and 4, the improved filter disk of the present invention is designated in its entirety by the reference numeral 10. The disk is truly circular and is formed of conventional slightly stretchable filter stock sheet material of which a wide variety is commercially available. Preferably, however, and in order to attain a more effective sealing action when the filter disk is used in connection with a coffeemaker of the percolator type, the filter disk is formed of non-woven matted fibers which are largely, but not entirely, unidirectional, the directional characteristic of the fibers being illustrated in FIG. 3 by the uneven substantially parallel fiber lines 12. The diameter of the disk 10 is substantially equal to a standard diameter dimension of the circular bottom wall of the filter basket of a conventional coffeemaker of the percolator or drip type and may thus be on the order of 3, 3½, 4, 4½, or 5 inches, these being to give most commonly employed diameters. A C-shaped slit consisting solely of an arcuate cut 16 is formed in the central region of the disk, the arcuate cut of the slit having its center coincident with the geometric center of the disk and the ends of the slit lying substantially on points which are 180° removed from each other.

Where filter disks which have a predominant fiber direction are concerned, the arcuate cut 16 is preferably, but not necessarily, formed so that the ends of the cut lie in a diametric plane which extends parallel to the "grain" of the disk. By such an arrangement, improved or tighter sealing action around the basket stem will take place but it should be understood that with slightly stretchable filter stock material of a good grade and having a high wet strength factor, effective sealing will take place regardless of the direction of the arcuate cut 16 with respect to the predominant fiber direction. As best shown in FIG. 3, the C-shaped cut 16 results in the formation of a D-shaped flap 18.

The radius of the cut 16 is substantially the same as the outside radius of the basket sleeve which surrounds the riser tube of a coffeemaker of the percolator type and, because of this fact, an effective sealing function is performed by the present filter disk when the same is operatively installed in the basket of a percolator-type coffeemaker. This function can best be described by reference to the coffeemaker 20 of FIG. 1. Such coffeemaker is conventional in its construction and includes the usual pot 22, a riser tube unit 24 including a tube proper 26, and a coffee-retaining basket 28 having an annular perforate bottom wall 30 from which there projects upwardly and centrally a sleeve 32 which receives therethrough the upper end region of the tube proper 26. The remaining details of the coffeemaker 20 bear no relation to the present filter disk and a description thereof is, therefore, deemed unnecessary.

The manner in which the filter disk 10 is operatively installed in the coffeemaker 20 is schematically illustrated in FIG. 1. Initially, the disk 10 is aligned with the upper end of the tube proper 26 as shown in dotted lines and then is moved bodily downwardly so that the upper end of said tube proper forces the D-shaped flap 18 upwardly and displaces the same as shown in broken lines. In connection with further downward movement of the disk, the tube proper 26 and the basket sleeve 32 penetrate the D-shaped opening from which the flap is upwardly displaced with the result that both the arcuate edge and the diametric edge of said opening closely hug the basket sleeve 32. By reason of the fact that the arcuate cut 16 is 180° and of substantially the same radius as the outside radius of the upstanding basket sleeve 32, the base or proximate portion of the flap 18 is caused automatically to curve snugly around the adjacent portion of the basket sleeve 32 when the disk is shifted downwards to the fullest extent where it rests flatly on and against the basket bottom wall 30. This is clearly shown in FIG. 5 of the drawings. By having the disk portion which defines the curved or arcuate part of the aforementioned D-shaped opening closely hug the adjacent portion of the basket sleeve 32 and by having the base or proximate portion of the flap 18 automatically curved into close hugging relation with the adjacent portion of the basket sleeve 32 there is a complete seal between the central portion of the filler disk and the lower end of the basket sleeve with the result that there are no voids which would result in a pronounced diminution of the filtering action or efficiency of the filter disk as a whole. The aforementioned complete seal prevents any coffee grounds from passing into the lower portion of the interior of the pot 22 and also results in the filter disk 10 maintaining a proper level of coffee liquid within the basket so that a maximum amount of coffee brewing takes place in connection with proper use of the percolator-type coffeemaker 20.

In penetrating the D-shaped opening from which the flap is displaced, the linearly straight diametric edge region of the opening is constrained to wrap itself around a portion of the cylindrical surface of the basket sleeve 18 as clearly shown in FIGS. 1 and 5, this wrapping operation being accomplished by a general upward displacement of the material of the disk at the base of the flap 18. From an inspection of FIG. 5 it will be observed that when the filter disk assumes its final position in face-to-face contact with the circular bottom wall 46 of the basket 10, the material of the filter disk completely encompasses the basket sleeve 32 in tight fitting relationship and no voids remain between the disk and sleeve through which liquid otherwise might drain.

The manner in which the filter disk 10 may be operatively installed in a coffeemaker of the drip type is shown in FIG. 2. The coffeemaker 40 of FIG. 2 is conventional and consists of the usual pot 42 and basket 44, the latter having a circular perforate bottom wall 46. An annular outwardly extending rib 48 on the side wall of the basket 44 rests upon the rolled open rim 50 of the pot 42, thus maintaining the basket in a suspended condition within the pot as is conventional. Installation of the filter disk 10 within the coffeemaker 40 is effected by the simple expedient of centering the disk above the open upper rim of the basket as shown in dotted lines and then lowering the same as shown in broken lines until the disk comes to rest on the bottom wall 46 as shown in full lines. Stated otherwise, the disk 10 is simply dropped in the basket 44 where it will come to rest by gravity upon the bottom wall 46. Since no displacement of the flap 18 takes place, the flap remains in the general plane of the disk and the disk remains functionally imperforate except for its microscopic porosity. The perforate bottom wall 46 of the basket 44 has the same diameter as the bottom wall 30 of the basket 28 and it is for this reason that the filter disk 10 may be used interchangeably in the two coffemakers 20 and 40.

From the above description, it wlil be apparent that the present invention provides a filter disk which is readily useable in connection with either the percolator or the drip-type of coffemaker. Since the basket diameters of both percolator-type baskets and drip-type baskets have the same range of sizes with the same progressive incremental increase of one-half inch, by availing himself of a complete set of filter disks embodying the present invention, a retailer is able to effect a 50% reduction in the inventory on his shelves.

The invention is not to be limited to the exact arrangement of parts shown in the accompanying drawings or described in this specification as various changes in the details of construction may be resorted to without departing from the spirit or scope of the invention.

Having thus described the invention what I claim as new and desire to secure by Letters Patent is:

1. A filter disk adapted for use interchangeably with a percolator-type coffeemaker basket having a circular perforated bottom wall from which there projects upwardly from its center a tubular mounting sleeve of circular cross section, and with a drip-type coffeemaker basket likewise having a circular perforated bottom wall of the same diameter as the bottom wall of the percolator-type coffeemaker basket but which is devoid of a tubular mounting sleeve, said filter disk being adapted, when used with either basket, to rest flatly on the bottom wall thereof, said filter disk being formed of slightly stretchable filter stock material and having formed in the central region thereof a C-shaped slit defining a D-shaped opening including a straight base portion and an arcuate crest portion, said slit also establishing a conformably shaped D-shaped flap which normally lies in the plane of the disk and closes said opening but which is adapted to be upwardly displaced by the mounting sleeve of the percolator-type coffeemaker basket when the sleeve is projected through the opening, said slit being truly semi-circular and having an arcuate extent of precisely 180° and a radius substantially the same as the outside radius of the mounting sleeve so that the ends of the slit lie on a diametric line with respect to the semicircular slit and the straight base portion of the U-shaped flap is equal in length to the diameter of the slit to the end that when said sleeve is projected through the D-shaped opening in connection with application of the disk to the percolator-type coffeemaker basket the curved truly semicircular portion of said D-shaped opening closely hugs the adjacent portion of the mounting sleeve and said originally straight full-diameter base portion of the flap is automatically stretched and curved into a 180° arc and such close hugging relation with the adjacent portion of the mounting sleeve that there is formed between the central portion of the disk and the mounting sleeve a complete seal without the formation of voids, said disk having substantially the same over-all diameter as the bottom walls of the two baskets in order that it may be positioned coextensively on the bottom wall of either basket with the flap assuming its normal position in the case of the drip-type coffeemaker basket and its upwardly displaced position in the case of the percolator-type coffeemaker basket.

References Cited
UNITED STATES PATENTS 3,250,398  5/1966  Ajiletta _____ 210—477 X
3,343,682  9/1967  Harvith _____ 210—477

REUBEN FRIEDMAN, *Primary Examiner.*

C. DITLOW, *Assistant Examiner.*